J. & I. Newburg.

Domestic Boiler.

No. 2,618. Reissued May 21, 1867.

Witnesses
J. N. Combs
G. W. Reed.

Inventor
Josef Neuburg
Ignaz Neuburg

United States Patent Office.

IGNAZ NEUBURG, OF NEW YORK, N. Y., ASSIGNEE OF JOSEF AND IGNAZ NEUBURG.

*Letters Patent No.* 59,441, *dated November* 6, 1866; *reissue No.* 2,618, *dated May* 21, 1867.

COOKING APPARATUS AND REFRIGERATOR.

The Schedule referred to in these Letters Patent and making part of the same.

TO ALL WHOM IT MAY CONCERN:

Be it known that the following is a full, clear, and exact description of a new and useful improvement in Cooking Apparatus and Refrigerators, invented by JOSEF NEUBURG and IGNAZ NEUBURG, both of the city, county, and State of New York, reference being had to the accompanying drawing, making a portion of this specification, in which—

Similar letters of reference indicate corresponding parts in both figures.

The object of this invention is to provide a cheap and efficient non-conducting packing or material adapted to use in refrigerators, cooking apparatus, and the like; and it consists in the construction of a packing or material in the shape of boxes made of pasteboard and fitted one within another, whereby a very efficient non-conductor of heat is secured for the purposes above named, as well as one which may be made at a moderate cost and applied to the purpose for which it is required with very great convenience and facility.

To enable others to understand the nature and construction of the invention, I will proceed to describe it with reference to the drawings.

Figure 1:
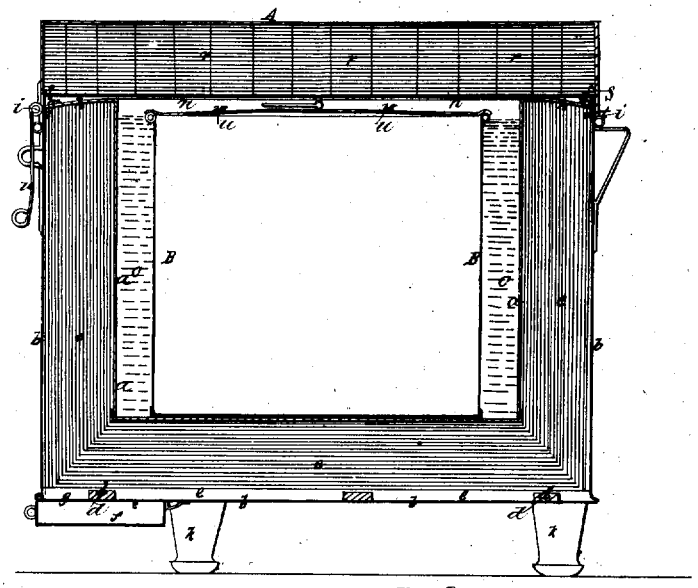
Figure 1 is a vertical transverse section of a cooking apparatus, in which is employed a non-conducting packing made according to the aforesaid improvement.
Figure 2:
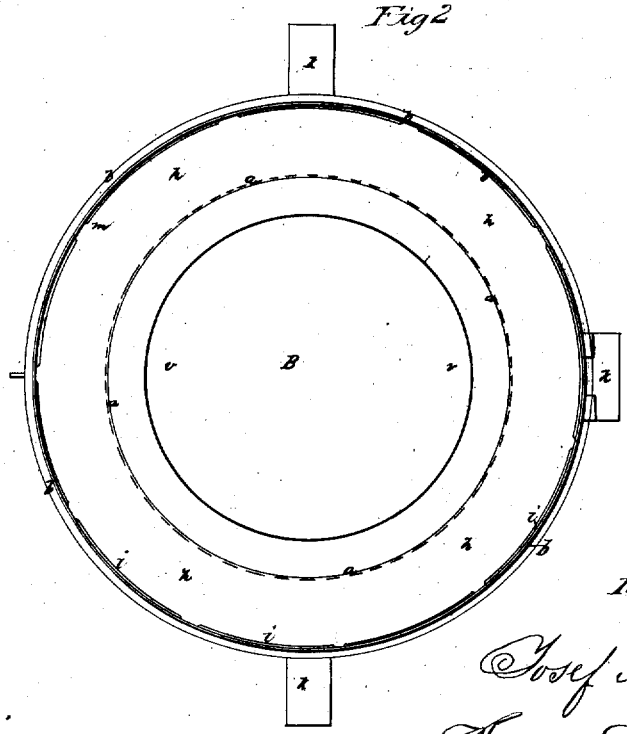
Figure 2 is a plan or top view of the same with the cover removed.

The invention is represented in the drawings as employed in a cooking apparatus, the shell or casing of which consists of two sheet-metal cases or vessels marked respectively *a* and *b*, which are placed one within the other, as represented more fully in fig. 1, with a space between them, in which is situated the non-conducting packing or material composed of pasteboard boxes or cases fitted one within another, and hereinafter fully described. Secured centrally within the casing *a b*, is a smaller vessel, B, designed to receive the articles to be cooked, and hinged or otherwise properly attached to the aforesaid casing is a lid or cover, A, which is made double and filled with a non-conducting layer composed of pasteboard cut into disks and fitted snugly within the said cover. The lower or inner plate *n* of the cover is of somewhat less diameter than the rim thereof, so that a narrow space is left between such rim and cover, as shown at *s*. The annular plate *h*, which covers the space between the two parts *a b* of the outer casing of the apparatus, has its outer edge somewhat depressed, and formed with slots or openings *i* which communicate with the aforesaid space. Placed underneath the casing *a b*, is a pan, *f*, which communicates with the space just mentioned by means of an opening, *g*, formed in the bottom of the outer part *b* of the casing. The non-conducting packing *c*, with which the space between the inner and outer parts or vessels *a b* of the casing of the apparatus is filled, is formed of pasteboard shaped into cases or boxes, which in this instance are closed at one end, and are made of a shape corresponding to that of the inner and outer metallic cases *a b* just mentioned. These pasteboard cases or boxes are placed one within another, and are fitted into the aforesaid space between the cases *a b*, as shown in fig. 1, thus constituting a thick non-conducting layer or filling around the sides and bottom of the apparatus to prevent the transmission of heat through, or the radiation of heat from, the aforesaid sides and bottom.

When the apparatus is used for cooking purposes the central vessel B is nearly filled with hot or boiling water, and the meat or vegetables to be be cooked are also placed therein; and the cover A is tightly fastened down, whereupon the radiation of the heat from such hot or boiling water being prevented by the non-conducting packing *c* of the sides and bottom of the casing *a b*, and the non-conducting filling *r* of the cover A thereof, the said heat is caused to slowly cook or stew the meat or vegetables contained in the aforesaid inner vessel B. The vapor that rises from the vessel B is for the most part condensed upon the inner plate *n* of the cover A, and falling upon the annular plate *h* passes through the slots or openings *i* downward through the packing *c* into a space, *e*, underneath the same, where it passes to the pan *f*, from which it is emptied when desired.

When the apparatus is to be used as a refrigerator, the meat, vegetables, or other articles to be preserved are simply placed in the central vessel B, and the cover is fastened down as hereinbefore set forth, and the non-conducting nature of the packing *c* of the casing *a b*, and of the filling *r* of the cover, effectually prevents the inward passage or transmission of heat from the atmosphere, so that the contents of the aforesaid central vessel are effectually kept or retained in a cool condition.

What I claim as the invention of myself and JOSEF NEUBURG, and desire to secure by Letters Patent, is—

1. The non-conducting packing or material composed of pasteboard boxes fitted one within another, substantially as herein set forth for the purpose specified.

2. The double casing *a b*, and non-conducting material *c*, having an annular gutter *m*, openings *i*, opening *g*, and pan *f*, and furnished with the non-conducting cover A, in combination with the central vessel B, the whole constructed and arranged substantially as herein set forth for the purpose specified.

IGNAZ NEUBURG.

Witnesses:
J. W. COOMBS,
G. W. REED.